Feb. 15, 1955     R. E. LINDEMANN     2,702,070
APPARATUS FOR SPLICING ADHESIVE MATERIAL
Filed Oct. 16, 1951                 2 Sheets-Sheet 1
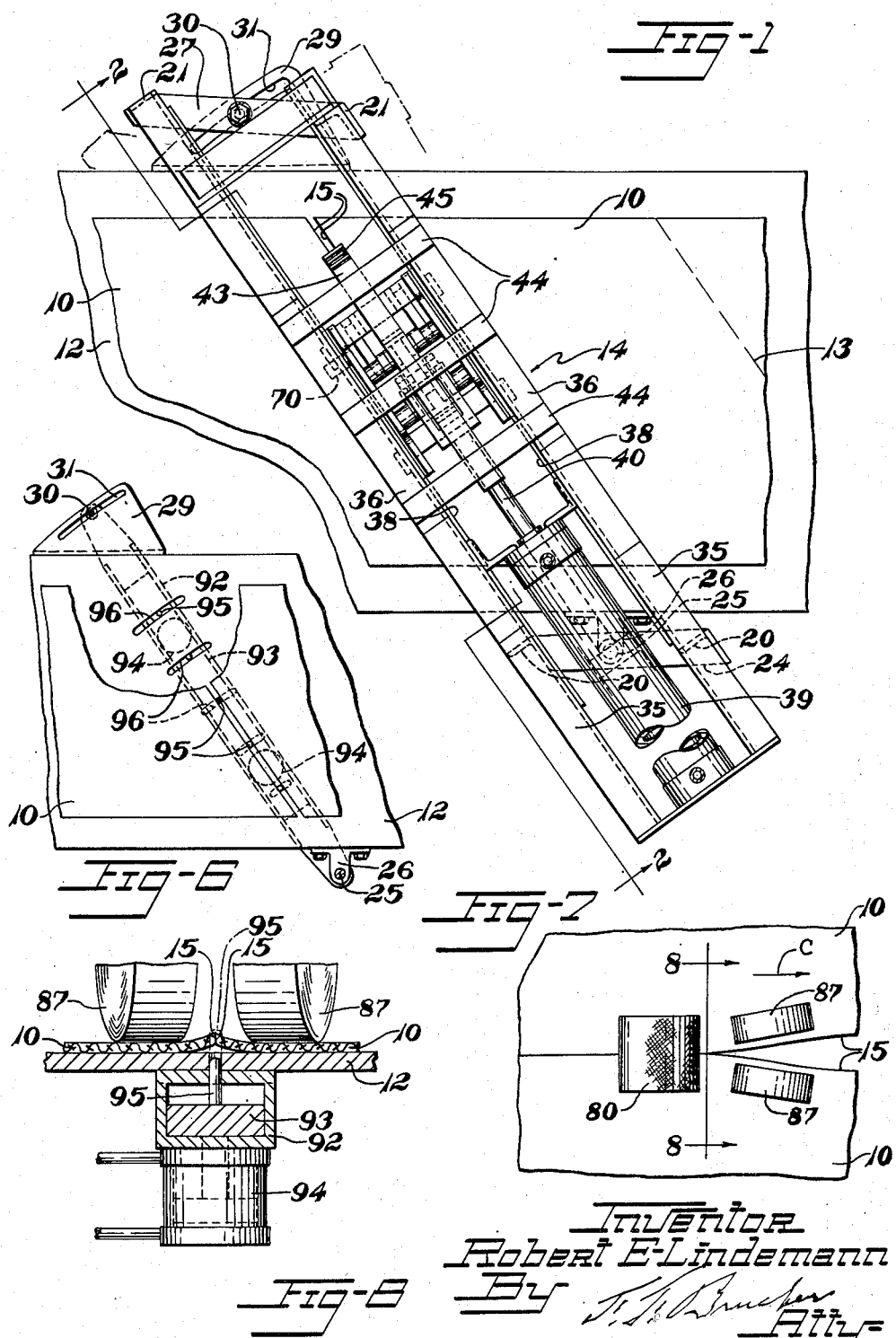
Inventor
Robert E. Lindemann
By
Att'y Feb. 15, 1955   R. E. LINDEMANN   2,702,070
APPARATUS FOR SPLICING ADHESIVE MATERIAL
Filed Oct. 16, 1951   2 Sheets-Sheet 2
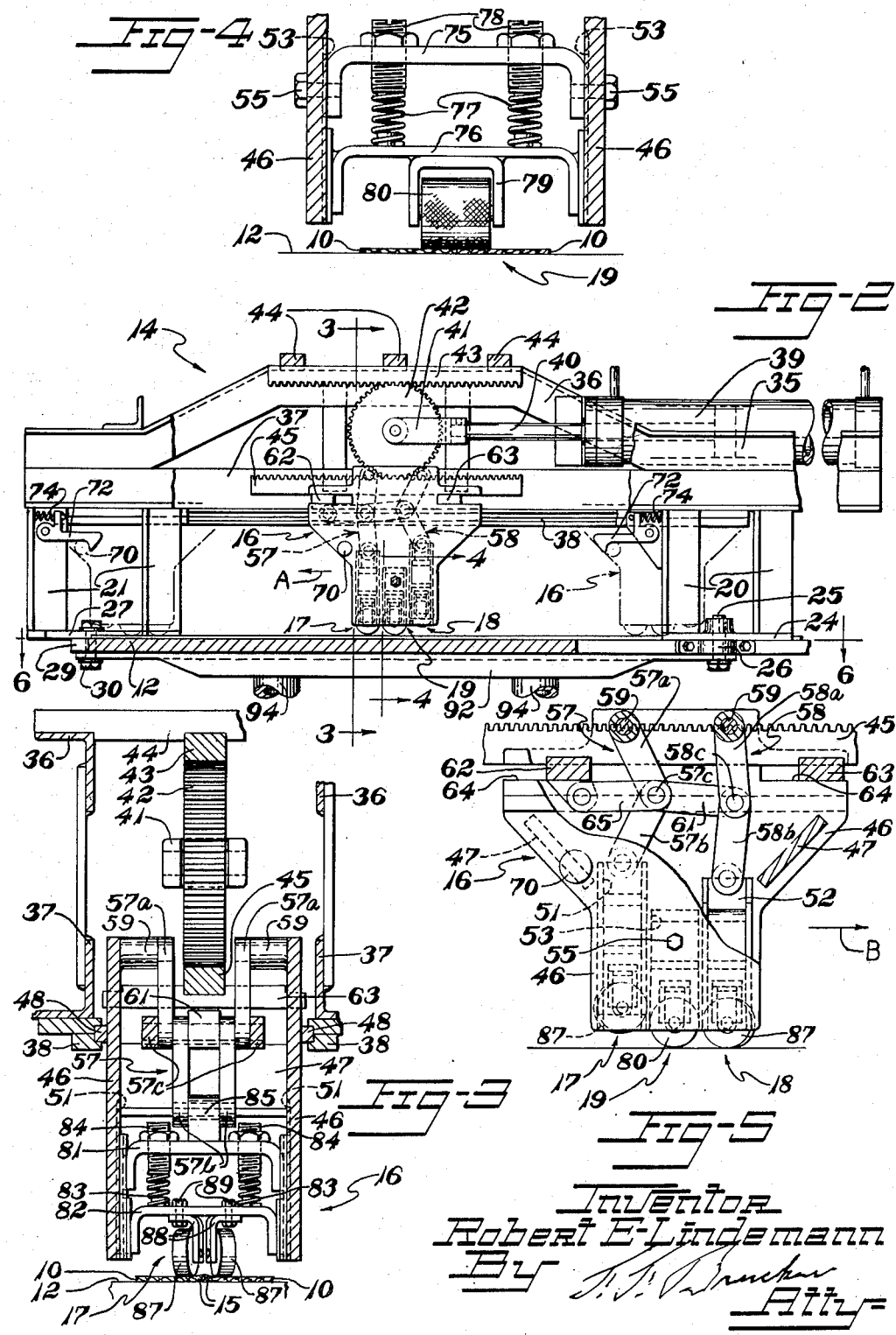
Inventor
Robert E. Lindemann
By
Att'y United States Patent Office 2,702,070
Patented Feb. 15, 1955

2,702,070
APPARATUS FOR SPLICING ADHESIVE MATERIAL

Robert E. Lindemann, Le Roy, Ohio, assignor to The B. F. Goodrich Company, New York, N. Y., a corporation of New York Application October 16, 1951, Serial No. 251,580

4 Claims. (Cl. 154—42)

This invention relates to the splicing of adhesive sheet material such as rubber-covered fabric and the like, and more particularly it relates to an improved apparatus for splicing such material. The apparatus of this invention may be advantageously employed in the preparation of ply stock for pneumatic tire casings and for the rubber-covered fabric materials used in the manufacture of hose, belting, etc.

In accordance with this invention, apparatus is provided which includes means for supporting the material with the edges or margins to be spliced aligned with each other, and a carriage mechanism which is movable in reverse directions relative to the supporting means along these margins of the material. The carriage mechanism includes a pair of splicing units which are separately and alternately engageable with the margins of the material when the carriage mechanism is moved in reverse directions along the margins. Each of these splicing units, when engaged with the margins, is adapted to urge the margins into contact with each other, and the carriage mechanism further includes means for pressing contacting margins together to effect their adherence. The carriage mechanism is designed such that when its direction of movement is reversed, the appropriate splicing unit will be shifted into engagement with the fabric and the other splicing unit will be disengaged from the fabric so that a splice may be formed when the carriage mechanism is moved in either direction along the margins. By making suitable adjustments in the splicing units, either a butt splice or a lap splice may be formed between the margins.

The invention will be further described with reference to the accompanying drawings in which:

Fig. 1 is a plan view of apparatus constructed according to and embodying this invention;

Fig. 2 is a side elevation of the apparatus with portions broken away, the view being taken on the line 2—2 of Fig. 1;

Fig. 3 is a cross-sectional view taken on line 3—3 of Fig. 2;

Fig. 4 is a view on an enlarged scale taken on the line 4—4 of Fig. 2;

Fig. 5 is a side elevation on an enlarged scale and with portions broken away showing the splicing mechanism;

Fig. 6 is a view on a reduced scale, taken on the line 6—6 of Fig. 2;

Fig. 7 is a plan view which indicates schematically the position and operation of certain elements of the splicing mechanism; and Fig. 8 is a view taken on the line 8—8 of Fig. 7.

The embodiment of the invention shown in the drawings is especially useful for butt-splicing sheets of bias-cut, tire cord material 10 to form tire plies. The bias-cut sheets 10 to be spliced are positioned on a smooth-surfaced table 12 (see Fig. 1) which supports the splicing mechanism. The mechanism is then operated to splice two adjacent sheets together and then another sheet 10 is spliced to one of the former sheets, etc., to form a relatively long strip of ply stock which will be rolled up in a suitable liner or the like for delivery to the tire-building equipment.

The splicing mechanism comprises a frame 14 which extends diagonally over table 12 parallel to and above the aligned edges 15—15 of the material to be spliced. The frame slidably supports a carriage 16 (Fig. 2) which is movable back and forth across the table along the aligned edges 15—15 of the material. The carriage supports two material-engaging splicing units 17 and 18 and between these units there is a material-pressing or rolling unit 19. As the carriage is moved across the table either unit 17 or unit 18 will be in contact with the material depending on the direction in which the carriage is being moved. The unit 17 and the unit 18 are each designed to urge the aligned edges progressively into contact with each other. The unit 19 is adapted to effect coalescence of the edges brought into contact with each other by the units 17 or 18. The structure and operation of these elements will be more fully explained in what follows.

The sheet material to be spliced by the apparatus from time to time may be cut at different bias angles. The angles may range from about 45° to about 60° and in order to accommodate sheets cut at different angles, the frame 14 is adjustably mounted on the table so that it may be conveniently shifted to a required position parallel to the edges of the particular bias-cut fabric to be spliced. The portion of the apparatus which permits this adjustment includes a pair of upright bars 20—20 which support one end of the frame above the table 12 and another pair of upright bars 21—21 which support the other end of the frame. The bottoms of the upright bars 20 are connected together by a horizontal bar 24 which is pivotally retained by a pivot 25 to a bracket 26 secured to one side of the table so that the frame may be swung arcuately over the surface of the table about the pivot 25. At the other end of the frame the bottoms of the upright bars 21 are connected together by a horizontal bar 27 which rests on a bracket 29 mounted on the side of the table 12 opposite pivot 25 (see Figs. 1 and 6). The bar 27 is releasably secured to the bracket 29 by a bolt 30 which extends through the bar and through a curved slot 31 in the bracket 29. To adjust the angular position of the frame with respect to the table, the bolt 30 is loosened and the frame is then swung about the pivot 25 to the desired position. The bolt 30 is slideable along the slot 31 as the frame is moved and at any desired position the frame may be fastened tightly on the table by tightening the bolt 30.

The portion of the frame structure bridging across the table includes a pair of parallel member 35—35, the ends of which are supported by the upright bars 20—20 and 21—21 at opposite sides of the table. The midsections of the members 35—35 are bent upwardly at 36—36 to form a recess to receive mechanism which controls the movement of the carriage. Below the members 35—35 there are two spaced, parallel members 37—37 which extend horizontally between the uprights 20—20 and 21—21. The horizontal frame members 37—37 cooperate to support a pair of track members 38—38 (see Fig. 3) between which the carriage 16 is mounted for movement back and forth across table 12.

The carriage 16 is slideably movable along the tracks 38—38, by a fluid-operated pressure cylinder 39 which is mounted between the frame members 35 at the end of the frame supported by the uprights 20—20. The cylinder 39 has a piston rod 40 which is reciprocable longitudinally of the frame and at the outer end of the piston rod there is a clevis 41 which rotatably supports a gear 42 in the recess defined by the upwardly bent portions 36—36 of members 35—35. Gear 42 is in mesh with an upper, stationary, toothed rack 43 which is rigidly supported along the center of the frame in an inverted position by several lateral cross bars 44 extending between the members 35—35 in the recess portions 36—36. The gear 42 is also meshed with a lower rack 45 which is mounted on the top of the carriage 16. As the piston rod 40 is reciprocated by the cylinder, the gear 42 rolls along the stationary rack 43 and also meshes with the lower rack 45 which extends along the top of the carriage 16 and is slideably connected to the carriage. The linear motion of the gear plus the rolling action of the gear in the lower rack 45 imparts a translational motion to the carriage so that the carriage is slid along the tracks 38—38. The gear-and-rack mechanism is effective to double the stroke length of the piston rod 40. In other words, for each increment of distance through which the piston of the cylinder is moved, the carriage is moved through a distance twice the increment. Therefore a cylinder half as long as track 38 may be used to move the carriage from one end of the track to the other end. Any ordinary valve equipment may be used to supply fluid to and to operate cylinder 39.

The structure of the carriage 16 is more clearly brought out in Figs. 3 and 5. The carriage is formed with a pair of vertical plates 46—46 which are connected together at each end of the carriage by cross bars 47—47. The top of the carriage is supported in the tracks 38—38 by a pair of relatively thin, horizontal bars 48—48 which are located on opposite sides of the carriage along the outside surface of the plates 46—46. The bars 48—48 fit into the tracks 38 as shown in Fig. 3 and it is desirable to form these bars 48—48 of a metal such as bronze, etc., so that the bars slide with minimum friction in the track 38.

Near the bottom of the carriage areas of the inside surface of each plate 46 are recessed to form three parallel, vertical guideways 51, 52 and 53 between the plates. These guideways are provided to receive, respectively, the material-engaging units 17 and 18 and the material-pressing unit 19. Unit 19 is located in the center guideway 53 and this unit is immovably secured in its guideway to the plates 46—46 by the bolts 55—55 (see also Fig. 4). The material-engaging units 17 and 18 are located, respectively, in the guideways 51 and 52 at the sides of unit 19 and these units 17 and 18 are slideably supported in their respective guideways by the toggle linkages 57 and 58, respectively. The toggle linkages are each suspended between the plates 46—46 by the pivots 59—59. The toggle linkages 57 and 58 are constructed, respectively, of an upper pair of links 57a, 58a and a lower lower pair of links 57b, 58b, preferably all of equal lengths. Links 57a and 58a are suspended from pivots 59—59 and in turn these links support the lower links 57b and 58b by pivots 57c and 58c, respectively. The lower ends of the pair of links 57b are pivotally connected to slideable unit 17 and the lower end of the pair of links 58b are pivotally connected to slideable unit 18 as shown in Fig. 5. In order to permit the units 18 and 19 to be moved in opposite vertical directions simultaneously, the pivots 57c and 58c are connected together by a thrust link 61 which is shorter than the distance between the pivots 59—59 and which extends in the direction of the track members 38—38. Thus if linkage 57 is flexed as shown in Fig. 5, the unit 17 is raised and therefore, due to the length of link 61, the linkage 58 will be straightened so that unit 18 is lowered in its guideway. Conversely if linkage 58 is flexed as shown in Fig. 2, then the position of units 17 and 18 will be reversed, viz unit 17 will be lowered and unit 18 will be raised in its guideway. Through this action of the toggle linkages the units 17 and 18 may be alternatingly raised and lowered in their respective guideways.

The movement of the toggle linkages is controlled by the slideable rack 45 which is supported midway between plates 46—46 on the carriage. This rack 45 is slid across the top of the carriage by the piston 40 each time the carriage reaches one end of track 38—38 so that the position of the units 17 and 18 is reversed each time the movement of the carriage is reversed. The rack 45 is slideably supported on the carriage by cross-members 62 and 63, each of which fits into a pair of horizontal slots 64—64 formed in the ends of the plates 46—46 and in which slots the cross members may be moved back and forth parallel to the tracks 38—38. The slideable cross member 62 is pivotally connected to a thrust link 65 which extends to and is fastened to pivot 57c of toggle linkage 57 so that as the rack 45 is slid back and forth the toggle linkages are alternatingly flexed and straightened and, therefore, the units 17 and 18 will be moved up and down as heretofore explained.

The action of these elements of the carriage may be more clearly understood by comparing Fig. 2 with Fig. 5. In Fig. 2 the carriage is being moved along tracks 38—38 in the direction of arrow A. The rack 45 has been slid longitudinally to its extreme leftward position on the carriage and in this position of the rack 45 the toggle linkage 57 is relatively straight so that the unit 17 is in contact with the fabric. Also in this position the thrust link 65 has flexed the other toggle linkage 58 so that the unit 18 is raised away from the fabric and is inside the carriage.

When the carriage is traveling in the reverse direction as indicated by arrow B in Fig. 5, the rack 45 has been slid longitudinally along the top of the carriage to its extreme rightward position. In this position of the rack the toggle linkages are reversed. Toggle linkage 58 is straightened so that material-engaging splicing unit 18 is lowered and is in contact with the fabric, and toggle linkage 57 is flexed so that unit 17 is raised inside the carriage.

The apparatus is designed so that the carriage may be moved once across the material from one side of the table to the other to form a splice. Additional material may be then aligned under the carriage and this new material may be spliced on the return trip of the carriage. Sometimes it may be desirable to move the carriage back and forth across the splice one or more times to obtain a strong splice. Each time the direction of the carriage is reversed, however, the slideable rack 45 is shifted longitudinally by the piston 40 across the carriage to change the position of the units 17 and 18. The material-pressing unit 19, however, always remains in contact with the fabric and operates the same as the carriage is being moved in either direction. It is important to note that whenever the carriage is moving in one particular direction, the material-engaging unit which leads unit 19 is always in contact with the material and the other material-engaging unit which trails unit 19 is always raised inside the carriage.

The extreme positions to which the carriage may be moved at the ends of the tracks 38—38 is indicated in chain dotted lines in Fig. 2. As soon as the carriage reaches one of these positions the cylinder 39 is operated in the reverse direction to move the rack 45 longitudinally to the other side of the carriage. To obtain this operation a post 70 (Figs. 1 and 2) is provided on one of the plates 46 of the carriage. The post is adapted to snap under the hooks 72 which are pivotally fastened to the frame at the ends of the tracks 38—38. There is one hook 72 at each end of the tracks 38—38 and each hook is engaged with a spring 74 to hold the hook in operative position. Each hook 72 is adapted to engage the post 70 and hold the carriage so that it dwells at the end of the track for a relatively short interval and during this dwell period the pressure cylinder 39 is operated to reverse the movement of piston rod 40. The initial reverse force exerted by the piston rod is utilized to pull the slideable rack 45 to the other side of the carriage thereby shifting the positions of the material-engaging units 17 and 18 as explained above. The hook 72 has an inclined hook-face which permits deflection of the hook under a strong force applied to the carriage to move it along its tracks 38—38 so that after rack 45 has been moved to its extreme opposite position, the force applied by the piston on the carriage is sufficient to unlatch the carriage from hook 72.

Structural details of the material-pressing unit 19 are shown in Fig. 4. This unit 19 is formed with an upper yoke member 75 and a lower slide member 76 both with downwardly turned ends which fit into the vertical guideway 53 in the plates 46—46. The upper member 75 is fastened in the guideway by the bolts 55—55 but the lower member 76 is vertically slideable in guideway 53 and is suspended from member 75 by a pair of compression springs 77—77 mounted on the studs 78—78. At the center of the lower member 76 there is a downwardly-extending bracket 79 which supports a relatively wide roller 80 having a peripheral surface which is knurled or otherwise roughened in a suitable manner. This roller is pressed against the fabric by the springs 77—77 and is adapted to roll along the portions of the fabric urged into contact by either the material-engaging splicing unit 17 or the unit 18 depending on the direction in which the carriage is moved. Roller 80 functions in the same manner as the carriage is moved in either direction.

The material-engaging units 17 and 18 (see Fig. 3) are similar to each other in structure. Each of these units is formed with an upper yoke member 81 and a lower slide member 82, both of which extend laterally across the carriage between the plates 46—46 and have downwardly turned ends which fit slideably into the recessed portions of the plates forming the vertical guideways. These members 81 and 82 are connected together by a pair of vertical compression coil springs 83—83 which are fastened to the lower member 82 and which are at their upper ends engaged with a pair of studs 84—84 threaded through the upper member 81. The upper yoke member 81 of unit 17, as shown in Fig. 3 is pivotally connected to links 57b of the toggle linkage 57. Similarly, the upper yoke member 81 of unit 18 (Fig. 5) is pivotally connected to the link 58b of toggle linkage 58. The portion of each of these units 17 and 18 which contacts material 10 is a pair of rollers 87—87. Each roller 87 is individually supported by a bracket 88 which is adjustably fastened by a bolt 89 to the lower member 82 of each unit. The springs 83—83 urge the lower member 82 downwardly and when each unit is in its lowered position in the carriage the springs 83—83 are compressed and tend to press the rollers 87—87 against the material on the table.

Figs. 7 and 8 illustrate the operation of the pair of rollers 87—87 of either unit 17 or 18 and roller 80 of unit 19 as the carriage is moved. The rollers 87—87 are adjusted with their axes inclined to each other so that they will butt-splice opposed edges 15—15 of the sheets 10. The edges 15—15 of the material are first aligned in relatively close proximity but preferably not touching each other. The rollers 87—87 contact the fabric along the margins of the edges with the two edges between the rollers.

Assuming that the rollers 87—87 are to be moved relative to the material in the direction of arrow C in Fig. 7, the rollers will be adjusted so that they are toed outwardly from each other and will tend to roll in divergent planes. In other words as the rollers 87—87 are moved concertedly each roller 87 has a normal rotational track which is different from the direction in which the carriage is moved along the tracks 38—38 so that each roller tends to roll away from the edge 15 adjacent it. The movement of the carriage is a translational or linear motion which is parallel to the edges 15—15. Therefore the rollers 87—87 are dragged sideways somewhat as the carriage proceeds along the tracks 38—38. The force opposing the movement of each roller may be resolved into a component parallel to the plane of the roller and also into a component perpendicular to the plane of the roller. The former or first said component causes the wheel to rotate against the material as the roller is moved. The latter or second said component produces a side thrust on the roller and it is the reaction of this component acting along the surface of table 12 which tends to urge the edge of the material away from the roller as the roller is moved. In this manner the margins of the material are urged together into contact with each other.

When the rollers 87—87 are adjusted in the manner shown in Fig. 7, the margins of the material tend to curl or raise slightly above the surface of the table 12 as shown in Fig. 8 as the margins are slid together. The roller 80 of unit 19 follows closely behind the rollers 87—87 so that as soon as the edges 15—15 are butted together and raised slightly the roller 80 presses these edges flat against the table to effect the coalescence of the edges while material spaced laterally of the seam is held against the table by rollers 87—87. The edges of material coated with a plastic such as unvulcanized rubber will be sufficiently tacky that a strong splice may be formed without excessive amounts of pressure. The springs 77—77 of unit 19 press the knurled roller 80 against the fabric and they provide sufficient pressure to form the desired splice.

Since the carriage is adapted to be moved in reverse directions along the tracks 38—38 the rollers 87—87 of unit 17 are adjusted so that they are toed outwardly relative to the end of the frame supported by uprights 21 and the rollers of unit 18 are toed outwardly relative to the end of the frame supported by uprights 20.

The rollers 87—87 may be adjusted in other ways to urge the edges together. For example, if the rollers are cambered so that they are closer together where they touch the fabric the rollers will tend to have a normal rotational track away from the direction in which the carriage is moved and it has been found that this adjustment is sufficient to form a splice. Alternatively, a lapsplice may be formed by adjusting the rollers 87—87 so that one of them rolls straight ahead and the other roller is set in nonparallel relation to the first roller. A single roller 87, properly adjusted is operable to urge the margin it rolls against into contact with an opposed margin although it is more difficult to obtain good butt splices with a single roller. Various forms of splices may be obtained by adjusting the rollers 87—87 in different positions. The rollers 87—87 may be embodied in a hand tool if desired rather than mounting them in a frame and carriage as shown, and apparatus may be employed which includes only a knurled roller 80 and one or more rollers such as rollers 87—87 if desired.

The splicing mechanism operates more effectively if the opposed edges 15—15 of the material, prior to being spliced, are aligned accurately in laterally contiguous relation. To align fabric properly the mechanism shown in Figs. 2, 6 and 8 is provided. This aligning mechanism includes a channel 92 which extends laterally across the table underneath it. One end of this channel is engaged with the pivot 25 as is shown in Fig. 2 and the opposite end of the channel is fastened to the bolt 30 so that as the frame is swung to different angular positions across the table the channel 92 moves with the frame. The channel contains a horizontal bar 93 inside it which is movable vertically in the channel toward and away from the bottom of the table by pressure cylinders 94—94. The bar 93 has a plurality of spaced upright material spacing pins 95 which extend upwardly toward the table 12 and into arcuately formed slots 96 in the table top so that as the frame is moved pivotally these pins 95 are movable in the arcuate slots. To space the fabric properly cylinders 94—94 are operated to raise the bar 93 in the channel 92 so that the pins 95 project above the top surface of table 12. As soon as the edges 15—15 are aligned properly against the spacing pins 95 the cylinders 94—94 are operated to lower the bar 93 and thereby retract the pins below the surface of the table so that the pins do not interfere with the operations of the splicing rollers.

To summarize the operation of the apparatus it may be noted that one of the first steps in splicing two sheets of material will be to operate the cylinders 94—94 to raise the spacing pins 95 about the table through the slots 96. Each edge of the material to be spliced may then be aligned with the pins 95 and then cylinders 94—94 will be operated to retract the pins. The operator then energizes cylinder 39 to move the carriage in one direction across the table along the margins of the opposed edges of the material to be spliced. When the piston rod first starts to move it slides rack 45 across the carriage to operate the toggle linkages so that the material-engaging unit leading unit 19 will be lowered into contact with the fabric adjacent the opposed edges and the material-engaging unit trailing unit 19 will be raised into the carriage. Thereafter the carriage 16 is moved across the fabric to splice the edges together. When the carriage has been moved completely across the fabric to the end of the tracks 38—38 the movement of the cylinder 39 will be reversed to move the carriage in the reverse direction and this initial reverse movement of the cylinder will shift the positions of the units 17 and 18. Then before the carriage is moved toward the other end of the frame another sheet may be aligned with the unspliced end of one of the other sheets and a second splice formed on the return run of the carriage.

Variations may be made without departing from the scope of the invention as it is defined in the following claims.

I claim:

1. Apparatus for splicing adhesive sheet material, said apparatus comprising a guideway, and carriage mechanism movable in reverse directions in the guideway above portions of said material to be spliced, the carriage mechanism including two material-engaging units, each unit having a pair of rollers with each roller supported so that its normal rotational track diverges from the track of its mating roller in the unit, each unit being operable to roll against the material adjacent said portions to be spliced to urge said portions progressively into contact with each other as the carriage is moved in the guideway, one of said units being in contact with the material as the carriage is moved in one direction and the other of which units being in contact with the material as the carriage is moved in the reverse direction, and means for shifting the relative positions of the units in the carriage into and out of contact with the material when the direction of movement of the carriage is reversed in the guideway, and means for pressing the contacting portions of the fabric to effect the adherence of said portions when the carriage is moved in either direction in the guideway.

2. Apparatus for splicing opposed edges of a flexible adhesive sheet material, the apparatus comprising means for supporting the material with the opposed edges to be spliced aligned in substantially laterally contiguous relation to each other, a pair of material-engaging splicing units movable translationally relative to the supporting means in reverse directions along the margins of the opposed edges, each of said units being rotatable against the margins to urge the opposed edges into contact with each other as the units are moved translationally along the margins, one of said units being engageable with the material when the units are moved in one direction along the margins and the other of said units being engageable with the material when the units are moved in the reverse direction, means for shifting the units respectively into and out of engagement with the material when the direction of movement of the units is reversed, and means for progressively pressing the edges urged together by said units against the supporting means to effect the adherence of said portions.

3. Apparatus for splicing opposed edges of adhesive sheet material, said apparatus comprising means for supporting the material with the opposed edges to be spliced aligned in laterally contiguous relation to each other, splicing means movable in reverse directions relative to the supporting means along said opposed edges, the splicing means including a pair of material-engaging units for engaging the margins adjacent said edges to urge the edges progressively toward each other, one unit being engageable with the material when the splicing means is moved translationally in one direction and the other unit being engageable with the material when the splicing means is moved in the reverse direction, and each of said units including an element rotatable against the margin when engaged therewith and supported so that its normal rotational track is different from the direction in which the splicing means is moved and which track diverges from the direction in which the splice is being formed, and means for progressively pressing the edges urged by the respective units into contact with each other to effect the adherence thereof as the splicing means is moved in either direction.

4. Apparatus for splicing adhesive sheet material, said apparatus comprising means for supporting the margins of the material to be spliced, said means including means for aligning the edges of said margins in laterally contiguous relation to each other, which aligning means is projectable and retractable relative to the supporting means, a guideway extending across said supporting means along the aligned margins of the material, a carriage movable back and forth in the guideway over said margins, a pair of splicing units in the carriage each movable toward and away from the margins, one of said units being adapted to engage the margins as the carriage moves in one direction and the other of said units being adapted to engage the margins as the carriage is moved in the reverse direction, means for shifting the said units into and out of contact with the fabric to bring the appropriate unit into contact with the fabric when the direction of movement of the carriage is reversed, each unit being rotatable against the margins to urge them laterally into contact with each other, and means for progressively pressing the contacting edges against the supporting means as the respective units have brought the edges together.

References Cited in the file of this patent

UNITED STATES PATENTS

| Re. 21,593 | Friz | Oct. 8, 1940 |
| 2,273,185 | Engler et al. | Feb. 17, 1942 |
| 2,273,463 | Campbell et al. | Feb. 17, 1942 |
| 2,516,280 | Welch | July 25, 1950 |
| 2,556,476 | Lamport | June 12, 1951 |
| 2,561,019 | George | July 17, 1951 |